United States Patent
McShane

[15] 3,653,259
[45] Apr. 4, 1972

[54] ULTRASONIC FLOWMETER SYSTEMS

[72] Inventor: James L. McShane, Churchill, Pittsburgh, Pa.

[73] Assignee: Westinghouse Electric Corporation, Pittsburgh, Pa.

[22] Filed: Mar. 6, 1970

[21] Appl. No.: 17,196

[52] U.S. Cl. .................................................73/194 A
[51] Int. Cl. .................................................G01f 1/00
[58] Field of Search ..........................................73/194 A

[56] References Cited

UNITED STATES PATENTS

| 3,329,017 | 7/1967 | Yamamoto et al. | 73/194 A |
| 3,282,101 | 11/1966 | Yamamoto | 73/194 A |
| 3,537,309 | 11/1970 | Geohegan | 73/194 A |
| 3,293,921 | 12/1966 | Riordan et al. | 73/194 A |
| 3,349,614 | 10/1967 | Parker | 73/194 A |
| 3,473,378 | 10/1969 | Yoshiyama et al. | 73/194 A |

FOREIGN PATENTS OR APPLICATIONS

| 198,000 | 3/1967 | U.S.S.R. | 73/194 A |
| 146,517 | 8/1962 | U.S.S.R. | 73/194 A |

OTHER PUBLICATIONS

Improvements in Sing-Around Velocity Meas. Forgacs, Journal of Acoust. Soc. Am. 12/60 p. 1697

Primary Examiner—Charles A. Ruehl
Assistant Examiner—John Whalen
Attorney—F. H. Henson, E. P. Klipfel and D. Schron

[57] ABSTRACT

Described are systems for measuring the rate of fluid flow wherein the time delay between acoustic pulses transmitted upstream and downstream in a fluid passing along a path of travel is multiplied by repeated transmissions in sing-around fashion. The systems of the invention have the advantage of fast response time, but do not require the measurement of very small time differences, particularly at low velocities, because of the cumulative effect of combing the time delays between upstream and downstream pulses over a period of time.

6 Claims, 15 Drawing Figures

INVENTOR
James L. McShane

BY Dean Schron
ATTORNEY

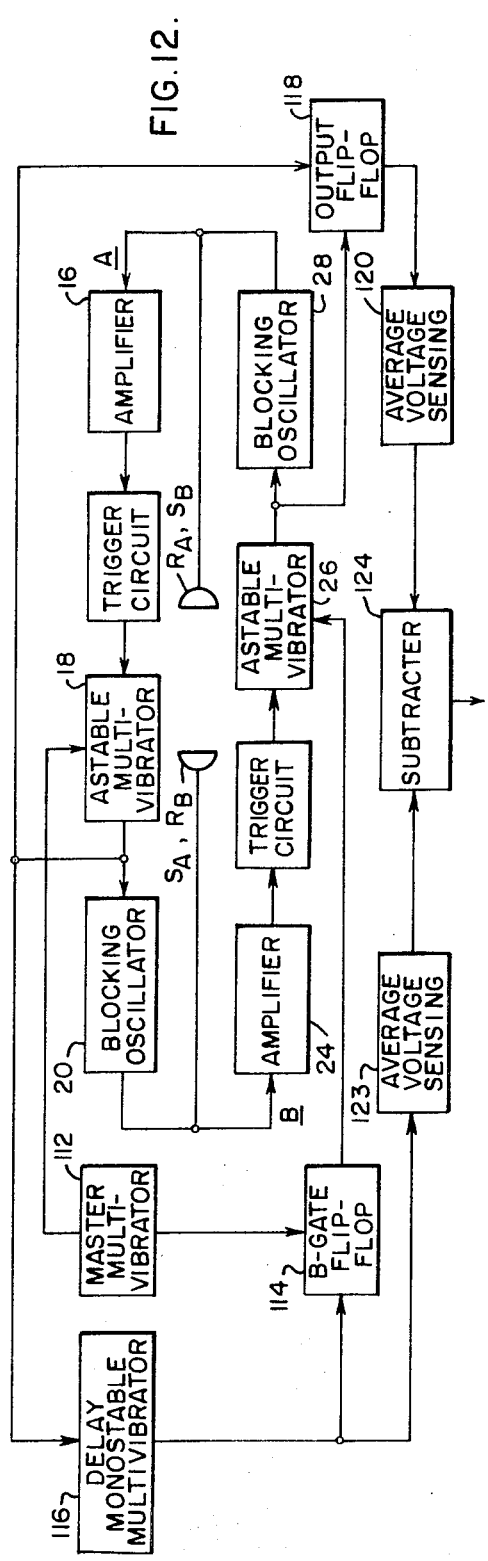
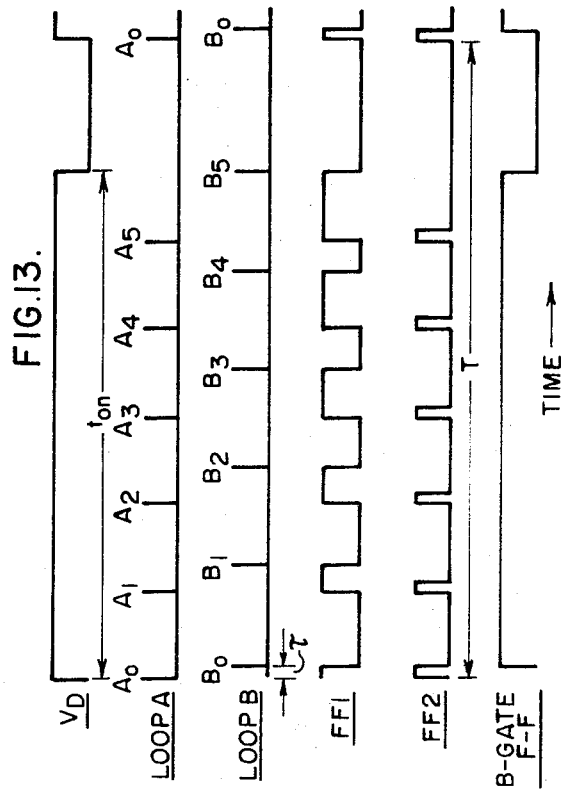
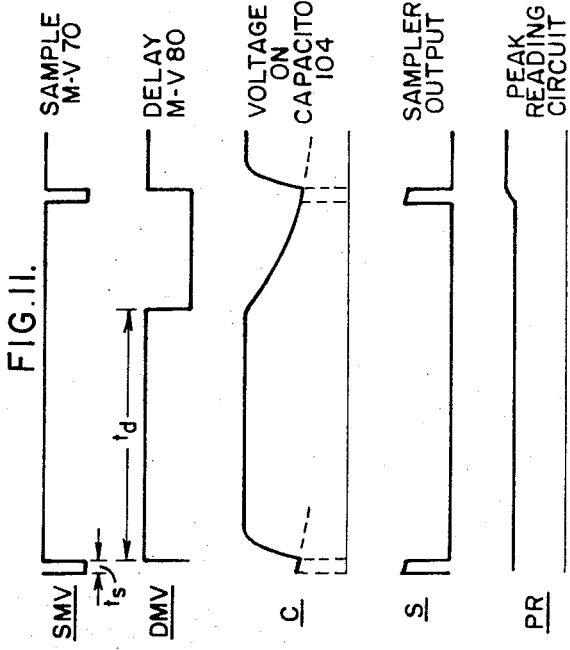

3,653,259

ULTRASONIC FLOWMETER SYSTEMS

BACKGROUND OF THE INVENTION

The usual principle of ultrasonic flowmeters involves the transmission of ultrasonic waves through a fluid medium in two directions, one upstream and the other downstream of the direction of flow, and comparing the transit times, normally over paths of equal lengths. The speed of propagation of the waves in the fluid medium is the same over both paths and the transit time varies according to the velocity of the fluid medium which shortens the transit time over the downstream path and lengthens the transit time over the upstream path. From the difference between the upstream and downstream transit times, the flow velocity of the liquid medium can be calculated by either a time difference or frequency difference technique.

The basic theory of the time difference and frequency difference techniques can be explained as follows: Assume, for example, that a conduit having a uniform flow of fluid of velocity, $v$, contains two sets of transducers facing each other at a spacing, $d$, between the two. If the sound velocity in the fluid at rest is $c$, then the respective transit times downstream, $t_A$, and upstream, $t_B$, can be represented as follows:

$$t_A = d/c+v \text{ and } t_B = d/c-v$$

If a pulse is simultaneously transmitted in both paths, the received signals arrive at times differing by $$\Delta t = t_B - t_A = (2dv/c^2 - v^2)$$

The velocity of the fluid, $v$, is almost always much smaller than the sound velocity, $c$, in the fluid at rest for all practical applications in liquids. For these applications, the approximate equation $$\Delta t = 2dv/c^2$$

is sufficiently accurate. Thus, $\Delta t$ is proportional to $v$ with the calibration constant being a function of $c$, and $v$ can be determined from the relationship:

$$v = (1/2d)c^2 \Delta t$$

where ($1/2d$) is a constant. Correction for changes in $c$ must be made in accurate systems.

In the usual frequency difference technique, the received pulse in each path is used to trigger another transmit pulse, thus generating a train of pulses in each path whose period equals the transit time. This is known as the sing-around method and the combination of circuitries, transducers, and transmission paths for each pulse train is referred to as a sing-around loop. The repetition frequencies, $f_A$ for the downstream case and $f_B$ for the upstream case, are:

$$f_A = 1/t_A = (c+v/d) \text{ and } f_B = 1/t_B = c-v/d$$

and the frequency difference is:

$$\Delta f = f_A - f_B = 2v/d$$

Thus, the frequency difference is proportional to the velocity of the fluid, $v$, with no dependence on $c$, the sound velocity in the fluid at rest.

One important advantage of the time difference system as compared to the frequency difference system is fast response, since a velocity determination can be made each transmission interval. However, in the past, attempts to provide a time difference system have usually involved the measurement of the time difference between received pulses after a single transmission. This meant that very small time differences had to be measured, particularly at low velocities; and the system was dependent upon a determination of $c$, the sound velocity in the fluid at rest. The frequency difference system provides a relatively easily measured quantity and freedom from effects of the velocity in the fluid at rest, but has a very slow response time because of the long counting interval required to accurately determine a frequency difference for low velocities. Furthermore, the frequency difference system requires two pairs of transducers, to avoid the condition where a transducer tries to transmit and receive at the same time. The time difference system, on the other hand, can be implemented with one pair of transducers by switching the transducer function from transmit to receive after the pulses are transmitted.

SUMMARY OF THE INVENTION

In accordance with the present invention, a time difference flowmeter system is provided wherein pulses are transmitted in both directions, using either two pairs of transducers or a single pair. The received pulses in each path trigger transmit pulses in their respective paths in sing-around fashion, as in the frequency difference system. However, the repetition of pulses is not continuous as in the frequency difference system but terminates after a given number of transmissions in each direction. The time difference between corresponding received pulses in each path is measured. This time difference is expanded over the original time difference; and the expanded time difference is then measured to determine the rate of fluid flow.

In one embodiment of the invention, the time difference between the last received pulse in one train of sing-around pulses and the corresponding pulse in the other train is measured. This expands the time difference by a factor equal to the number of repetitions which occurred. The expanded time difference can be measured much more easily to a given accuracy than the time difference between the first set of received pulses.

In other embodiments of the invention, the time differences between corresponding pulses in each train are summed. This summation, which is still proportional to the basic time difference between received pulses, provides greater sensitivity and can be measured to even greater accuracies in determining rate of fluid flow.

The above and other objects and features of the invention will become apparent from the following detailed description taken in connection with the accompanying drawings which form a part of this specification, and in which.

Figure 5A:
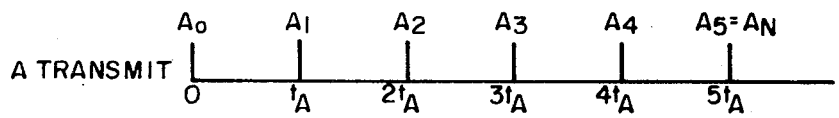
Figure 5B:
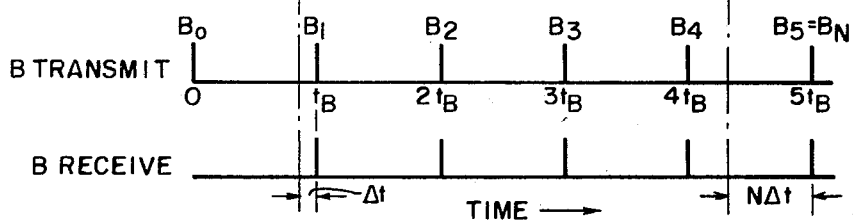
Figure 4:
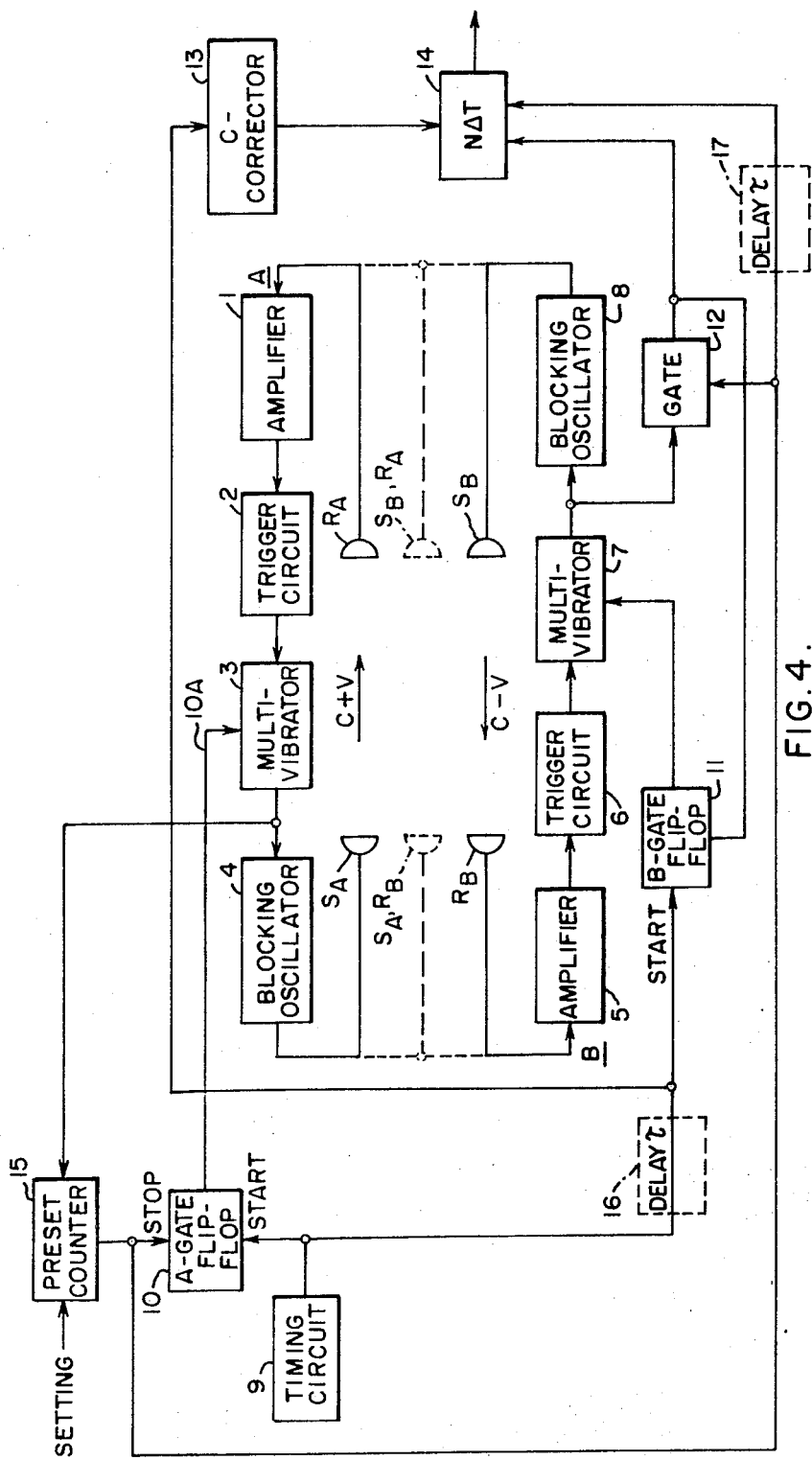
FIG. 4 is a schematic block diagram of one embodiment of the present invention.
Figure 7:
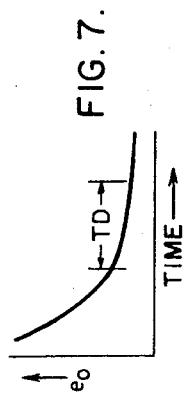
Figure 6:
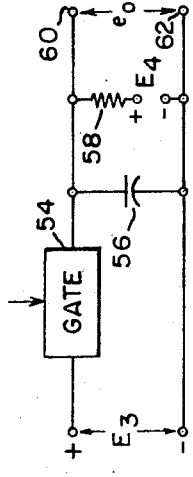
Figure 8:
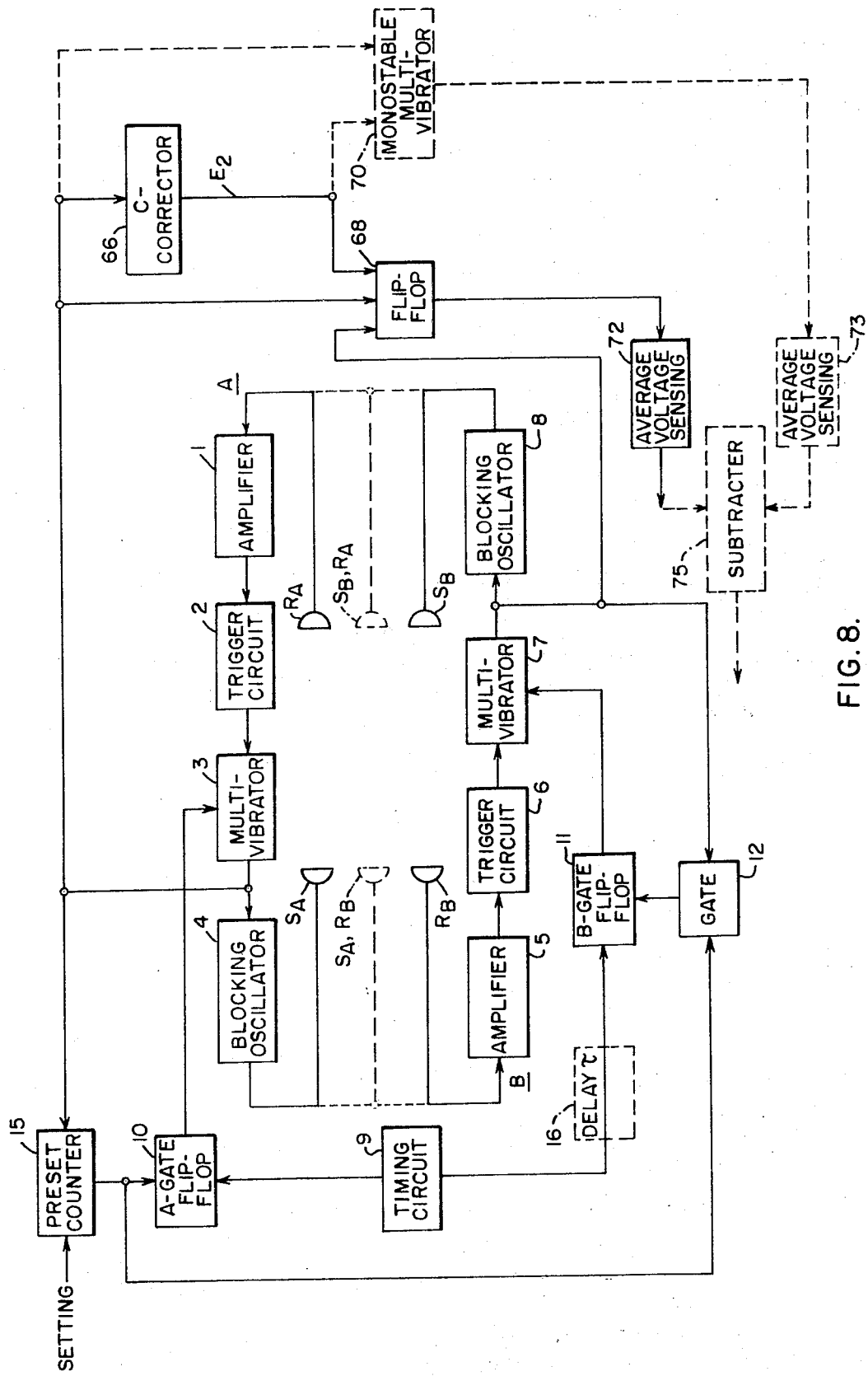
Figure 9A:
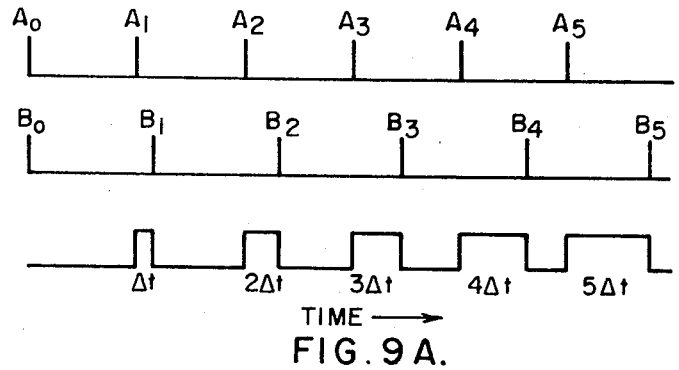
Figure 9B:
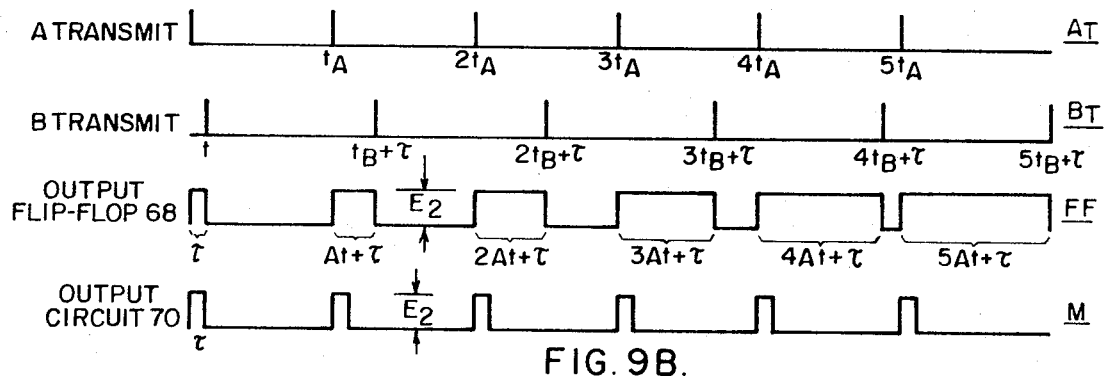
Figure 10:
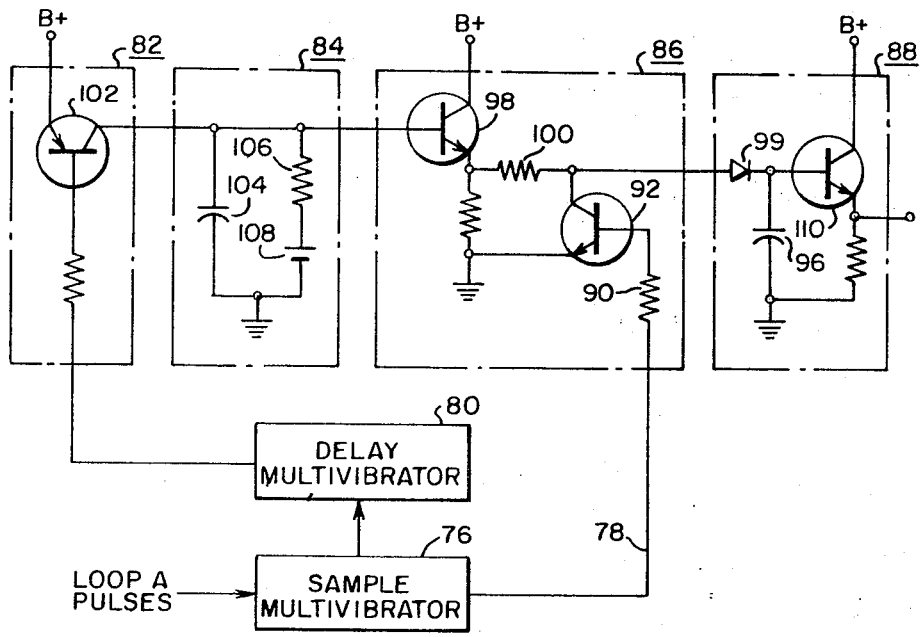

FIGS. 5A and 5B comprise time relationships of pulse trains illustrating the operation of the system of FIG. 4;

FIG. 6 is a schematic circuit diagram of the basic form of the "c-correction" circuitry for the embodiment of the invention shown in FIG. 4;

FIG. 7 is a graph of output voltage versus time illustrating the operation of the circuit of FIG. 6;

FIG. 8 is a schematic block diagram of another embodiment of the invention;

FIGS. 9A and 9B comprise waveforms illustrating the operation of the system of FIG. 8;

FIG. 10 is a schematic circuit diagram of the "c-correction" circuitry of the system of FIG. 8;

FIG. 11 comprises waveforms illustrating the operation of the circuit of FIG. 10;

FIG. 12 is a schematic block diagram of still another embodiment of the invention; and FIG. 13 comprises waveforms illustrating the operation of the system of FIG. 12.

GENERAL DISCUSSION OF TIME DIFFERENCE VELOCITY MEASUREMENT

Figure 1:
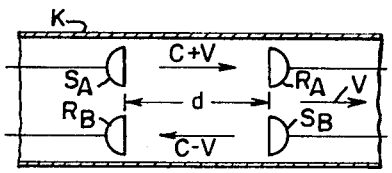
FIG. 1 is a schematic illustration of the basic transducer arrangement of an ultrasonic flowmeter.

With reference now to the drawings, and particularly to FIG. 1, a conduit K is shown having a fluid flowing therethrough in the direction of arrow V at a velocity $v$. Disposed within the conduit K is a first ultrasonic transmitting transducer $S_A$ and a receiving transducer $R_A$. The ultrasonic pulses transmitted from sending transducer $S_A$ to receiving transducer $R_A$, therefore, have a speed equal to ($c+v$) where $c$ is the sound velocity in the fluid at rest and $v$, as mentioned above, is the velocity of the fluid flowing through the conduit K. A second sending transducer $S_B$ is provided along with a second receiving transducer $R_B$. In this case, however, the ultrasonic wave energy transmitted from transducer $S_B$ to transducer $R_B$ is in a direction opposite to the direction of fluid flow through the conduit K. Consequently, the velocity of the wave energy passing from transducer $S_B$ to transducer $R_B$ is $(c-v)$.

As was explained above, the respective transit times downstream, $t_A$, and upstream, $t_B$, can be represented as:
$$t_A = (d/c+v) \quad (1)$$
and
$$t_B = (d/c-v) \quad (2)$$
If a pulse is simultaneously transmitted in both paths, the received acoustic signals arrive at times differing by:
$$\Delta t = t_B - t_A = (2dv/c^2 - v^2) \quad (3)$$
which, as was mentioned above, can be expressed for practical applications in liquids, where $v << c$, by the approximate equation:
$$\Delta t \cong 2dv/c^2 \quad (4)$$
Thus, $\Delta t$ is proportional to $v$ with the calibration constant being a function of $c$; and under the conditions for which $v << c$, $v$ can be determined from the relationship:
$$v \cong (1/2d)c^2 \Delta t \quad (5)$$
where $1/2d$ is a constant.

Figure 2:
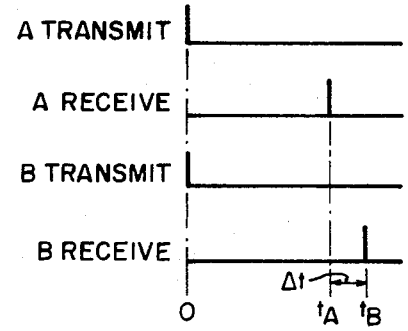
FIG. 2 illustrates time relationships of the received and transmitted pulses for the usual time difference system.

The time relationship of the transmitted and received pulses is shown in FIG. 2. The pulses from transducer $S_A$ and $S_B$ are transmitted simultaneously. However, the time $t_A$ required for the pulse to travel from transducer $S_A$ to transducer $R_A$ is less than the time $t_B$ to travel between transducer $S_B$ and transducer $R_B$ for the reason that the pulse from the latter sending transducer is traveling upstream. The difference in time between the received pulses is, therefore, $\Delta t$. Assuming that $\Delta t$ can be determined and that $c$ can also be determined, the velocity of the fluid passing through the conduit can be determined in accordance with equation (5) given above.

The method of determining $c$ involves measuring the transit times as the following derivation will show. Equation (3) can be written as:
$$\Delta t = 2v/d (d^2/c^2 - v^2) \quad (6)$$
From equations (1) and (2) we can obtain:
$$t_A t_B = (d^2/c^2 - v^2) \quad (7)$$
By substitution from equation (7) into equation (6),
$$\Delta t = (2v t_A t_B/d) \quad (8)$$
Solving for $v$ gives the result
$$v = (d/2)(\Delta t/t_A t_B) \quad (9)$$
Thus, $v$ can be expressed exactly (i.e., does not require that $v << c$) in terms of measurable quantities $\Delta t$, $t_A$ and $t_B$. The approximate form of equation (9) corresponding to equation (5) is:
$$v \cong (d \Delta t/2 t_{NF}^2) \quad (10)$$
where $t_{NF}$ = no-flow transit time.

As was previously mentioned, systems have been devised in the past for determining the velocity of fluid flowing through a conduit by measuring $\Delta t$, the time difference between a single pair of received pulses. This time difference, however, is generally very small and exceedingly difficult to measure, meaning that the accuracy of such systems is limited. As will be seen, the present invention provides a means for determining velocity in accordance with equation (9) given above, but wherein the quantity $\Delta t$ is expanded or made larger by repeated transmissions in sing-around fashion.

Figure 3:
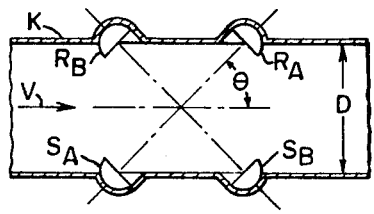
FIG. 3 illustrates a more practical configuration of an ultrasonic flowmeter wherein the transducers are disposed in the walls of a fluid-carrying conduit rather than being disposed within the conduit itself.

A practical application of the invention for conduits would not include transducers disposed directly within the conduit as shown in FIG. 1; although for velocity measurements in a medium of large extent, such as the ocean, probes could be arranged as in FIG. 1. Rather, the transducers would be arranged in or through the walls of the conduit perhaps as shown in FIG. 3. In this case, equations corresponding to equations (3), (5) and (9) are:
$$\Delta t = (2Dv \cot \theta/c^2 - (v \cos \theta)^2) \quad (11)$$
$$v \cong (1/2D \cot \theta) c^2 \Delta t, (v << c) \quad (12)$$
$$v = (D/2 \sin \theta \cos \theta)(\Delta t/t_A t_B) \quad (13)$$

where $D$ = diameter of conduit K and $\theta$ = angle between acoustic paths and conduit axis. It will be noted that equations (11), (12) and (13) differ from equations (3), (5) and (9) only in the constants, which depend on the geometry. For purposes of simplicity, the description of the various embodiments of the invention will be made under the assumption that the receiving and transmitting transducers are parallel to the direction of fluid flow rather than at an angle thereto, it being understood that it is necessary only to modify the equations given by using different constants if the transmitting and receiving transducers are disposed in the walls of the conduit.

ULTRASONIC FLOWMETER BASED ON MEASUREMENT OF N $\Delta$ T

One specific embodiment of the invention is shown in FIG. 4. Sing-around loop A consists of amplifier 1, trigger circuit 2, astable multivibrator 3, blocking oscillator 4, transducers $S_A$ and $R_A$, and the acoustic path through the fluid. The initial transmit pulse occurs coincidentally with the energizing of the sing-around circuit A by a signal on lead 10A. Blocking oscillator 4 generates a pulse which shock excites $S_A$. The received signal at $R_A$ consists of a short burst of oscillations. This signal is amplified by amplifier 1, whose output causes trigger circuit 2 to produce a trigger pulse at a predetermined portion of each received pulse, particularly the leading edge of the first or second half-cycle. This trigger signal causes astable multivibrator 3 to change states and the resulting multivibrator output triggers blocking oscillator 4, providing the regenerative sing-around action. The astable multivibrator 3 does not operate normally in the free-run mode but is synchronized at the higher sing-around repetition rate by pulses from trigger circuit 2. Its free-run capability is useful for self-restarting in the event an acoustic pulse is blocked, and for circuit testing purposes in the absence of a fluid path. Another function is provided by the astable multivibrator 3 by means of the interval during which the multivibrator remains in the state triggered by the pulse from circuit 2. During this interval, the multivibrator 3 is insensitive to trigger pulses generated by false signals at the amplifier input. One source of false signals is the occurrence of transmit pulses in the other sing-around loop, which in the two-transducer embodiment, are applied directly to the amplifier input. Sing-around loop B operates in an identical way.

Each interval of limited duration sing-around operation is started periodically by timing circuit 9, which provides a pulse which opens A gate 10 and B gate 11. Multivibrators 3 and 7 are gated ON and, as mentioned above, the first transmit pulse is generated in each loop. As the sing-around loops continue to run, the multivibrator 3 output signal is fed to a preset counter 15 which counts each multivibrator 3 output transition which produces a blocking oscillator 4 output pulse. The initial transmit pulse is the $A_o$ pulse as the waveform in FIG. 5A shows, and the counter is preset so that the Nth pulse $A_N$ causes counter 15 to produce an output pulse, which closes A gate 10 and deenergizes multivibrator 3 and hence loop A. The waveforms of FIG. 5 assume that two pairs of transducers are being used. The Nth transmit pulse occurs (the initial one being called the 0th), but the sing-around loop A does not respond to the resulting received pulse. Counter 15 output also opens gate 12 so that the next transition of multivibrator 7 which corresponds to the Nth transmit pulse in loop B ($B_N$) is passed through the gate 12, all previous output signals from multivibrator 7 being blocked. The output of gate 12 closes B gate 11 and stops the sing-around action in loop B.

The counter 15 output pulse, i.e., the $A_N$ pulse, is also fed to the N $\Delta t$ circuit 14, switching ON its output to a specific voltage level determined by the "c-corrector" circuit 13 in a manner to be described. The output of gate 12, being the $B_N$ pulse, is also fed to the N $\Delta t$ circuit 14, switching OFF its output. Thus, the N $\Delta t$ circuit 14 produces an output pulse of width equal to the separation between the $A_N$ and $B_N$ pulses, which is $Nt_B - Nt_A = N \Delta t$. The flowmeter output is the average value of a repetitive series of N $\Delta t$ pulses. It will be appreciated that since the pulses fed to circuit 14 must each result from the Nth transmitted pulses, the cycle times for the individual loops must be such that one loop does not lead the other by more than one full cycle.

The "c-corrector" circuit 13 has an output waveform which is proportional to $1/t^2$ during at least the interval in which the N $\Delta t$ pulse may occur, considering possible variations in sound speed $c$. This waveform is started by the timing circuit at the instant the two sing-around loops are started and $t$ for the "c-corrector" waveform is measured from that instant.

The N $\Delta t$ circuit output voltage level during the N $\Delta t$ pulse is equal to the instantaneous output of the "c-corrector" circuit 13. The following analysis shows that the output of the N $\Delta t$ circuit 14 is proportional to $\Delta t/(t_A t_B)$ as required by equation (9).

Let the output of the "c-corrector" circuit 13 be $E_1/t^2$ where $E_1$ is a constant voltage. The N $\Delta t$ pulse has a voltage level equal to the "c-corrector" output level and it begins at $Nt_A$ and ends at $Nt_B$. The N $\Delta t$ circuit 14 average output is:

$$E_o = \frac{E_1}{T} \int_{Nt_A}^{Nt_B} \frac{1}{t^2} dt = \left(\frac{E_1}{NT}\right) \frac{t_b - t_A}{t_B t_A} = \left(\frac{E_1}{NT}\right) \frac{\Delta t}{t_A t_B} \quad (14)$$

where $T$ is the repetition period of the intervals of limited duration sing-around operation. Means for producing a "c-corrector" circuit 13 output that is proportional to $1/t^2$ will be described later.

Other N $\Delta t$ circuit embodiments are subject to correction for $c$ changes in a similar way. Two specific N $\Delta t$ circuits are: a ramp generator which reaches a peak voltage dependent on N $\Delta t$, the ramp slope being made proportional to $1/t^2$; and a combination of oscillator and gate which provides an output in the form of a count where the number of cycles which occur during the N $\Delta t$ interval are counted, the oscillator frequency being made proportional to $1/t^2$. As an example of a ramp generator, consider a capacitance C being charged by a current equal to $I_1/t^2$ where $I_1$ is a constant current. The peak capacitor voltage reached after being charged by this current during N $\Delta t$ is:

$$E_p = \frac{I_1}{C} \int_{Nt_A}^{Nt_B} \frac{1}{t^2} dt = \left(\frac{I_1}{NC}\right) \frac{\Delta t}{t_A t_B} \quad (15)$$

A similar result can be shown for the case where cycles are counted.

The preceding description of the system of FIG. 4 dealt with the case where two pairs of transducers are used. The modifications required for one pair of transducers are indicated by dashed lines in FIG. 4, and waveforms are shown in FIG. 5B. Transducers $S_A$, $R_B$ and $S_B$, $R_A$ are each connected to the output of one sing-around circuit and to the input of the other. The amplifier is designed to recover quickly from the overload presented by the other loop transmit pulse, and the operation of multivibrators 3 and 7 as previously described prevents false triggering in either loop.

To avoid interference between early pulses in the two loops, a delay $\tau$ is introduced at two points in the block diagram (FIG. 4). Delay 16 delays the starting of loop B by a time $\tau$ after loop A starts. Delay 17 inserts a compensating delay before the $A_N$ pulse is fed to the N $\Delta t$ circuit 14. Delay 16 also causes the "c-corrector" waveform to start after a time interval $\tau$ following a timing pulse from timing circuit 9 occurs, so that the waveform will have the correct value during the N $\Delta t$ pulse which is delayed by delays 16 and 17 as described. These delays were shown as separate blocks for simplicity but it is desirable and possible to use the same delay circuit for both delay functions.

The basic idea of the "c-corrector" circuit is to generate an output voltage which varies proportionally to $c^2$ (more exactly, $c^2 - v^2$). Neglecting for a moment the small effect of $v$ on the total time for pulses to travel between transducers, this time $t_{NF} = d/c$. That is, the no-flow travel time $t_{NF}$ is inversely proportional to $c$. Thus, if we generate a voltage proportional to $(1/t_{NF})2$ it will be proportional to $c^2$ (see equation (10)). If we produce a voltage which varies as $1/t^2$, where $t$ is the time following a transmit pulse, and sample the value of this waveform at time $t_{NF}$ corresponding to the arrival of the received pulse, the output will be proportional to $1/t_{NF}^2$ and hence to $c^2$. Sampling the waveform, which varies as $1/t^2$, over the N $\Delta t$ interval gives a correction according to exact equation (9) rather than approximate equation (10), as has been shown.

The desired waveform is produced by approximating the $1/t^2$ function with an exponential decay function which can be constructed of resistors and capacitors. The approximation need be good only over the limited range of variation of $t_{NF}$ corresponding to changes in $c$ of a given fluid during operation, as due to temperature. For example, $c$ for liquid water varies from 4600 to 5100 feet per second as a function of temperature, which is a deviation of $\pm 5.1$ percent from a mean value of 4850 feet per second. The "c-corrector" could also account for the wider difference in a $c$ between different fluids, but it is likely that a manual adjustment of the "c-corrector" range would be used to account for most of the difference. In the above example, the $c^2$ variation is $\pm 10.4$ percent.

FIG. 6 shows a circuit whose output voltage can match the desired $1/t^2$ function with good accuracy over a range of $c$ variation of $\pm 30$ percent, a wider range than is generally needed. As will be seen, the circuit of FIG. 10, hereinafter described, is based on the same curve-matching principle; but for practical reasons has an added feature, a delay between the transmit pulse and the start of the exponential decay. The effect of the delay is to start the exponential decay nearer in time to the range of interest. An advantage is to reduce the initial voltage required to get a given voltage in the range of interest.

The "c-corrector" waveform can be generated for each transmission or for each set of repetitions. In the first case the time of sampling is $t_{NF}$; in the second case it is $Nt_{NF}$. Thus, the time scales of the waveforms are merely different by a factor of $N$.

The circuit of FIG. 6 includes a source of potential $E_3$ adapted to be applied through a gate circuit 54 across capacitor 56. In shunt with the capacitor 56 is the series combination of a resistor 58 and a second source of potential $E_4$.

The voltage decay across the capacitor 56 and the resulting output voltage $e_o$ can be represented by the curve of FIG. 7 which is represented by the equation:

$$e_o = K_1 \epsilon - K_2 t + K_3 \quad (16)$$

where
$K_1 = E_3 - E_4$,
$K_2 = 1/RC$ and
$K_3 = E_4$.

We choose $K_1$, $K_2$ and $K_3$ so that $e_o$ is proportional to $(1/t)^2$ over a limited time range, this time range being represented as TD in FIG. 7. Therefore, by substituting various values of $t$ in the range TD in the foregoing equation (16) and by following a curve-matching procedure, the optimum values of $E_3$, $E_4$ and $RC$ can be determined.

The resulting output voltage $e_o$ proportional to $c^2$ appears between terminals 60 and 62. Normally, the gate 54 is closed such that the capacitor 56 is charged with the voltage $E_3$. However, at time $t_o$, a pulse from the timing circuit 9, for example, enables the gate 54 whereby the capacitor 56 is caused to discharge through resistor 58 and the voltage source $E_4$. This continues until sampling of the output waveform occurs, whereupon the gate 54 is again closed, allowing capacitor 56 to recharge prior to the start of the next measurement cycle. Better approximations of the $1/t^2$ waveform are possible with more c-corrector circuit elaboration (which would add more terms to equation (16)).

ULTRASONIC FLOWMETER BASED ON MEASUREMENT OF THE SUM OF TIME DIFFERENCES OVER A TIME INTERVAL

As will be appreciated, the system shown in FIG. 4 utilizes only the $N \Delta t$ time shift. It is, however, also possible to utilize $(N-1) \Delta t$, $(N-2) \Delta t$, and other time intervals in addition. Considering the output to be the average voltage of a train of pulses, the output voltage can be increased by including all pulses between the Mth and the Nth where $M < N$. The output voltage will be given by:

$$E_o = \frac{E_2}{T} \sum_{n=M}^{N} n\Delta t \qquad (17)$$

where $E_2$ is the pulse voltage level and $T$ is the overall repetition period. The simplest approach, one that provides the greatest output voltage is to include all pulses from $\Delta t$ to $N \Delta t$ i.e., $M = 1$). The output, therefore, is equal to:

$$E_o = \frac{E_2}{T} \sum_{n=1}^{N} n\Delta t = \Delta t + 2\Delta t + 3\Delta t + \ldots + N\Delta t \qquad (18)$$

which is still proportional to $\Delta t$, but clearly larger than
$(E_2/T) N \Delta t$,
the output if only the $N \Delta t$ pulse system were used.

A system for accomplishing the foregoing is shown in FIG. 8 wherein elements corresponding to those of FIG. 4 are identified by like reference numerals. The system again includes two sing-around loops A and B each including an amplifier, a trigger circuit, an astable multivibrator and a blocking oscillator.

The system of FIG. 8 operates in the same manner as the system of FIG. 4 except for the readout and means of correction for speed of sound variations. Again, the basic description covers the case where two pairs of transducers are used, this case being more straightforward. Changes required in the block diagram for the two-transducer case are again shown by dashed lines.

Timing circuit 9 periodically starts each series of repetitions of the sing-around loops by causing A gate 10 and B gate 11 to energize multivibrators 3 and 7, respectively. $A_o$ and $B_o$ pulses (FIG. 9A) are generated at the instant the multivibrators are energized. When the $A_N$ pulse is received by counter 15 it produces a pulse which causes A gate 10 to deenergize multivibrator 3 and hence loop A. The counter output pulse opens gate 12 so that the $B_N$ pulse occurring later causes B gate 11 to deenergize multivibrator 6 and hence loop B. Thus, the timing and the determination of the duration of loop running times is the same as for the basic multiple time difference system described with reference to FIG. 4.

In the system of FIG. 8, loop A pulses $A_n$ turn ON flip-flop 68 and corresponding loop B pulses turn it OFF. Thus, flip-flop 68 generates a train of pulses as shown in FIG. 9A whose widths are successively equal to the time between $A_o$ and $B_o$, between $A_1$ and $B_1$, and so forth, until, for the last pulse, between $A_N$ and $B_N$. Pulses $A_o$ and $B_o$ occur at the same time so no output pulse is generated. The same would be true for all pulses if fluid velocity, $v = 0$. Flip-flop 68 output pulses have successive widths $\Delta t$, $2 \Delta t$, ..., $N \Delta t$, and the output voltage from average voltage sensing circuit 72 would be as given by equation (18).

To provide correction for $c$ variations, the voltage level $E_2$ of the flip-flop 68 output pulses is varied as before by a voltage sampled from a waveform that varies as $1/t^2$. In this case, however, sampling by the $N \Delta t$ pulse to produce an output proportional to $(\Delta t/t_A t_B)$ is not practical because the flowmeter output is made up of a series of pulses, which to use an extension of the c-correction method used previously, would require a corresponding series of waveforms proportional to $1/t^2$ with time scales proportional to $n$, the number of the pulse ($n = 0$, 1, 2, ..., N). One waveform varying as $1/t^2$ could be used but it would be required to be accurate over a wide t range. Also each pulse would have a different voltage level, varying as $1/N$ (see eq. 14), which would weight early pulses higher than later ones and thus reduce the advantage of time difference expansion. Instead, one waveform proportional to $1/t^2$ is used and it is sampled by a pulse of fixed length to produce a direct current voltage level $E_2$ which is fed to the flip-flop 68 to regulate the level of the entire series of output pulses at a voltage $E_2$.

The use of a fixed sampling time of the $1/t^2$ waveform is justified by the approximate equations (5) and (10), which make the use of the fact that $v^2 << c^2$ in practical applications. Taking the instantaneous voltage of the $1/t^2$ waveform at any instant between $t_A$ and $t_B$ would give a voltage proportional to $c^2$ with good accuracy. A somewhat better approximation is actually indicated by the description of the "c-corrector" circuit 66 which follows later. First it should be pointed out that the $1/t^2$ waveform is generated for each sing-around repetition rather than once for each series of repetitions as for the previous system. This merely reduces the time scale by a factor of $N$ and facilitates filtering the sampled pulses to produce a smooth direct current output $E_2$.

The "c-corrector" 66 output, if a waveform $E_1/t^2$ is sampled for a duration $t_s$ and if the average value of a train of pulses having the sampled level is used to determine $E_2$, is:

$$E_2 = \frac{NE_1}{T} \int_{t_A}^{t_A + t_s} \frac{1}{t^2} dt = \left(\frac{NE_1 t_s}{T}\right) \frac{1}{t_A(t_A + t_s)} \qquad (19)$$

If $t_s$ is made equal to the mean value of $\Delta t$ expected over the velocity range to be covered, then $t_A + t_s$ equals the mean value of $t_B$, and $E_2$ is proportional to $1/(t_A t_B)$ to a good approximation. Thus, the output of average voltage sensing circuit 72 is proportional to $\Delta t/t_A t_B$ to a good approximation, as required.

For two-transducer operation, delay 16 is introduced as before to delay the start of loop B by a time $\tau$ following the start of loop A. This delay adds a constant width to each of the flip-flop 68 output pulses, successive pulses none having widths $\Delta t + \tau$, $2 \Delta t + \tau$, ..., $N \Delta t + \tau$. To compensate for this effect, a monostable multivibrator 70 is triggered by each loop A pulse to produce a train of $n$ pulses having width $\tau$. The average value of this waveform is determined by average voltage sensing circuit 73, whose output is subtracted in subtracter circuit 75 to produce an output proportional to $\Delta t$ (for constant $c$). The "c-corrector" voltage sets the output level of the monostable multivibrator 70 pulses equal to that of the flip-flop 68 pulses. The subtracter output voltage is $$E_o = \frac{E_2}{T} \sum_{n=1}^{N} (n\Delta t + \tau) - \frac{NE_2 \tau}{T} = \frac{E_2}{T} \sum_{n=1}^{N} n\Delta t \qquad (20)$$

where, as before, variations in $E_2$ account for variations in $c$. The modificatons can also be used with two pairs of transducers. They improve the system in other ways: flip-flop 68 is not required to generate very narrow or zero width pulses at any time, and the subtractive output arrangement provides convenient method of zeroing the meter (i.e., by varying width or level of monostable multivibrator pulses) if residual $\Delta t$ due to slight differences in the sing-around loops cause a zero offset.

The operation of the circuit of FIG. 8 with only a single set of transducers can best be understood by reference to the waveforms of FIG. 9B. In this case, only the transmitted pulses of waveforms $A_T$ and $B_T$ are employed, the pulses in waveform $B_T$ being delayed with respect to those in waveform $A_T$ by the time delay $\tau$. Since the flip-flop 68 is turned ON in response to a transmitted pulse in the A loop and turned OFF in response to a transmitted pulse in the B loop, its output appears as waveform FF. The first pulse in waveform FF, for example, has a width equal to $\tau$; the second pulse has a width equal to $\Delta t + \tau$; the third pulse has a width equal to $2 \Delta t + \tau$; and so on. The output of the monostable multivibrator 70, shown as waveform M in FIG. 9B, comprises pulses of equal width, which width is equal to $\tau$, except possibly for small differences for zero-adjustment as explained above. Consequently, by subtracting the pulses in waveform M from those in waveform FF, the result will be:

$$\Delta t + 2\Delta t + 3\Delta t \ldots + N\Delta t$$

which is still proportional to $\Delta t$.

Thus, if the sing-around loops A and B are started periodically with a period $T$ to run for $N$ repetitions, and if the voltage level of the pulses in waveform FF is $E_2$, the output voltage, $E_o$, is:

$$E_o = \frac{E_2}{T} \sum_{n=1}^{N} n\Delta t. \qquad (21)$$

The system of FIG. 4, if repetition period were $T$, output pulse level were $E_2$, and $N = 5$, would have an average output voltage.

$$E_o = (5E_2 \Delta t/T). \qquad (22)$$

With the system of FIG. 8, on the other hand, the output voltage is:

$$E_o = \frac{E_2(\Delta t + 2\Delta t + 3\Delta t + 4\Delta t + 5\Delta t)}{T} = \frac{15 E_2 \Delta t}{T}. \qquad (23)$$

Thus, the output voltage from the system of FIG. 8 is increased by a factor of three over that for the system of FIG. 4. It is advantageous to make N as large as possible. Maximum $N$ is limited by the $N\Delta t$ interval approaching the sing-around period, $t_A$. In general, the output voltage is increased by a factor of $$(N+1)/2.$$

The details of the "c-corrector" circuit of FIG. 8 are shown in FIG. 10; and its operation is illustrated by the waveforms of FIG. 11. The operation of this circuit is similar in principle to that of FIG. 6, but differs in that a ($1/t^2$) waveform is initiated for each repetition of sing-around loop A. Furthermore, in order to obtain the maximum output voltage, the correction voltage is generated by charging a capacitor during a sampling interval, $t_s$. The peak voltage is held on the capacitor by providing a high resistance in the discharge path. A long time constant is desirable to smooth ripple and to average out small fluctuations in the correction circuit output (see waveform PR in FIG. 11). Actual changes in the speed of sound will be relatively slow and will be followed by the circuit. The resulting output voltage is applied to both the monostable multivibrator 70 and the flip-flop circuit 68 to vary their output voltage levels in accordance with changes in the speed of sound.

With specific reference to FIG. 10, transmitted pulses from loop A are applied to a sample monostable multivibrator 76 which will produce, on lead 78, the pulses of waveform SMV of FIG. 11. These pulses occur each time a pulse is transmitted by loop A and have a width equal to $t_s$, the sampling period. The trailing edge of each pulse in waveform SMV triggers a second monostable multivibrator 80 which produces the output waveform DMV comprising pulses having a width $t_d$. The circuitry of FIG. 10 includes a switch 82, an RC circuit 84, a sampler 86 and a peak reading circuit 88. The waveform SMV at the output of multivibrator 76 on lead 78 is applied through resistor 90 to the base of transistor 92 in the sampler circuit 86. The 0 voltage levels cut off the transistor 92, thereby disconnecting the anode of a diode 99 in the peak reading circuit 88 from near ground potential. As a result, the capacitor 96 in the peak reading circuit is charged by the output from the RC circuit 84 through emitter follower 98 and resistor 100.

At the trailing end of each sampling pulse in waveform SMV, switch 82 is closed (i.e., transistor 102 turned on) by waveform DMV, triggered as described from waveform SMV. During the delay $t_d$ thus initiated, capacitor 104 is charged and remains connected to B+ through transistor 102. At the end of the delay, transistor 102 is turned off by multivibrator 80, and the voltage starts to decay in the RC circuit 84 comprising capacitor 104 in parallel with resistor 106 and voltage source 108. The advantage of delaying the start of the decaying portion of the waveform across the capacitor, waveform C in FIG. 11, is that a higher voltage across the capacitor (output voltage) in the RC circuit can be obtained with a small initial charge on the capacitor. In other words, only the portion of the ($1/t^2$) waveform which is of interest is generated. The output is derived from the emitter of an emitter follower transistor 110 in the peak reading circuit 88 and is used to clamp the output level of the flip-flop 68 and monostable multivibrator 70 shown in FIG. 8. The output of the sampler as applied to the capacitor 96 is illustrated by waveform S in FIG. 11; while the output of the peak reading circuit 88 is illustrated by the waveform PR in FIG. 11. It will be noted in waveform C of FIG. 11 that the decaying portion terminates at the end of the sampling pulse. If the sampling pulse occurs later due to increased transit time in sing-around loop A, the capacitor voltage will continue to fall as indicated by the dashed line, and a lower voltage will be sampled.

ULTRASONIC FLOWMETER BASED ON PULSE SUMMATION WITH AUTOMATIC SPEED OF SOUND CORRECTION

In the embodiments of the invention described above, transmitted pulses are counted; and after a predetermined number of pulses have been counted, velocity is determined. This requires separate speed of sound correction. However, it is also possible to provide a flowmeter, based upon pulse summation, which operates over a fixed time interval, regardless of the number of pulse repetitions in that interval. This eliminates the need for a "c-corrector" circuit since speed of sound correction is provided automatically. This can be shown from the following mathematical analysis: Since $$\sum_{n=1}^{N} n\Delta t = \frac{N(N+1)}{2}, \qquad (24)$$

equation (21) above can be written $$E_o = \left(\frac{E_2}{T}\right) \frac{N(N+1)\Delta t}{2} \qquad (25)$$

The fixed time interval during which the loops operate should be chosen so that, for full scale velocity, coincidence between the Nth pulse in loop B and the ($N+1$)th pulse in loop A is closely approached. For this condition $$N \cong t_{on} - \tau/t_B \qquad (26)$$
$$N + 1 \cong t_{on}/t_A \qquad (27)$$

where $t_{on}$ is the time in which the sing-around loops operate during each period $T$.

Substituting these relationships in equation (25):

$$E_o \cong \frac{E_2 t_{on}(t_{on} - \tau)}{2T} \frac{\Delta t}{t_A t_B} \qquad (28)$$

From equation (9), $$\Delta t/t_A t_B = 2v/d$$

which can be substituted in equation (28) to yield $$E_o \cong \frac{E_2 t_{on}(t_{on} - \tau)}{dT} v, \qquad (29)$$

where the quantity in brackets is a constant. As exact coincidence is approached between the $A_{N+1}$ and the $B_N$ pulse, equations (28) and (29) approaches exact equality. In normal operation, deviations from equality in these equations will occur because the loop running time could end during the occurrence of an output pulse and because, for velocities below full scale, coincidence as defined above will not be closely approached. For large values of $N$, even these deviations are small; typically $N > 100$ for practical liquid flow applications.

It can be shown that for $N \Delta t \cong t_A/2$, i.e., half of the $N \Delta t$ value required for coincidence, which might correspond to a mid-scale velocity, the percentage deviation from the ideal equation is approximately $\pm 100/2N$, which, for $N = 100$, is $\pm 0.5$ percent variation. The variation stays within this limit over a wide range of $c$ variation. It should be pointed out that since the above variations are based on mid-scale velocities, the variations as a percentage of full scale would be reduced by half, or $\pm 0.25$ percent.

A system in accordance with the principles of the invention incorporating automatic speed of sound correction is shown in FIG. 12; while waveforms illustrating the operation of the circuit of FIG. 12 are shown in FIG. 13. The system again includes a pair of transducers $S_A$, $R_B$ and $R_A$, $S_B$ disposed within a conduit, not shown, and provided with two sing-around loops A and B each including an amplifier, an astable multivibrator and a blocking oscillator. The system is controlled by a master multivibrator 112 having a period T illustrated by the waveforms of FIG. 13. At time $t = 0$ in FIG. 13, the master multivibrator 112 enables the astable multivibrator 18 in sing-around loop A causing the first transmit pulse in loop A to occur at that instant. As soon as the first pulse is transmitted in loop A, it is also applied to a delay monostable multivibrator 116 which delays it by the time period $\tau$ in FIG. 13. The delayed pulse, actually the trailing edge of the delay monostable multivibrator 116 output pulse, triggers the flip-flop 114 which now enables the astable multivibrator 26 in sing-around loop B, the first transmit pulse in loop B occurring at the instant multivibrator 26 is enabled. The result, of course, is that the pulses in loop A shown in FIG. 13 lead those in loop B, the first two pulses $A_o$ and $B_o$ being separated by the time difference $\tau$. The delayed A pulses continue to be applied to the B-gate flip-flop 114, but after flip-flop 114 changes state in response to the $A_o$ pulse, it is insensitive to further pulses until reset by the master multivibrator 112.

Master multivibrator 112 determines loop A running time $t_{on}$ as well as the overall period T between the start of each series of sing-around repetitions. The two states of the output of master multivibrator 112, a free-running monostable multivibrator, have durations $t_{on}$ and $(T - t_{on})$, respectively, both of which are adjustable to establish $t_{on}$ and $T$. To increase the average output voltage, $t_{on}$ should be a large portion of $T$, as shown in waveform $V_D$ of FIG. 13. Accordingly, the dead time $(T - t_{on})$ is made only as long as necessary to reset the system for the next cycle of repetitions. Reducing dead time, $(T - t_{on})$, is desirable in that it also reduces output ripple and response time. The master multivibrator 112 gates loop A ON directly through astable multivibrator 18 for interval $t_{on}$ each period $T$. B-gate flip-flop 114 gates loop B ON in a similar manner through astable multivibrator 26 during an interval $(t_{on} - \tau)$ each period $T$, B-gate flip-flop 114 being turned ON by delay monostable multivibrator 116 and OFF by master multivibrator 112, the ON state being defined as the one which gates loop B ON.

The transmitted pulses from loop A are applied to one side of an output flip-flop circuit 118; while the transmitted pulses in loop B are applied to the other side of this same output flip-flop 118. The result is that the A pulses from loop A turn ON the flip-flop; whereas the B pulses from loop B turn OFF the flip-flop, the resulting output waveform of the flip-flop being that shown in FIG. 13 as waveform FF1. The output pulses from the flip-flop 118 are then applied to an average voltage sensing circuit 120 which will produce an average output voltage equal to the average voltage of the flip-flop output waveform of FIG. 13. This voltage, however, includes the time delay, $\tau$, which is incorporated into each pulse at the output of flip-flop 118. Accordingly, the output pulses from the monostable multivibrator 116, which are triggered by the A pulses, will have the waveform FF2 of FIG. 13. This waveform is applied to an average voltage sensing circuit 123 and subtracted from the voltage from circuit 120 in subtracter 124 to derive an output proportional to the velocity of the fluid passing between transducers $S_a$, $R_b$ and $R_a$, $S_b$.

Because the same delay circuit (multivibrator 116) generates the constant portion of the width of FF1 pulses and the width of FF2 pulses, good zero stability in the output voltage results from the subtraction of the average values of these two waveforms. Voltage levels of FF1 and FF2 pulses should be nearly equal and derived from the same source, for stability. Slight adjustment of the FF2 voltage level can be used as a zero adjustment to account for slight differences in rise and fall times between the FF1 and FF2 waveforms and for slight residual $\Delta t$ resulting from different electronic delays in the sing-around circuits, or from path differences if two pairs of transducers are used. If two pairs of transducers are used, monostable multivibrator 116, B-gate flip-flop 114, average voltage sensing circuit 123, and subtracter 123, and subtracter 124 could be eliminated, the output being taken directly from average voltage sensing circuit 120. However, to avoid having to generate the narrow early pulses of width $\Delta t$, $2 \frac{1}{2}t$, etc., and to provide convenient 17 zeroing as described, the arrangement of FIG. 12 has advantages for the case where two pairs of transducers are used.

The capability of this system to handle either direction of flow should be pointed out. If two-way flow is expected, delay $\tau$ can be made roughly half the sing-around period. In the case of reverse flow, waveform FF1 in FIG. 13 would show successively narrower pulses, the average value of FF1 would fall below the average value of FF2, and the output would be negative.

As will be appreciated, the sing-around loops in the embodiments described above operate for a limited time only. If loop running time is short enough to prevent pulse coincidence in the two loops, a single pair of transducers will suffice as described. The ability to operate with one pair of transducers can also be provided if a delay is introduced in one loop to keep the upstream and the downstream pulse trains interleaved. The length of the delay can be measured as the output or, if the delay is developed by a voltage-to-time converter circuit, the controlling voltage can be the output. To avoid the very small delays required if correction is made in each transmission period, correction can be made after a given number of pulses has occurred, or after a given amount of interloop shift has occurred. It may also be advantageous to have a delay in each loop, one or both of which is adjusted to keep pulse trains interleaved, the output being proportional to the difference between the two delays.

Although the invention has been shown in connection with certain specific embodiments, it will be readily apparent to those skilled in the art that various changes in form and arrangement of parts may be made to suit requirements without departing from the spirit and scope of the invention.

I claim as my invention:

1. In a flowmeter, the combination of at least one pair of oppositely disposed ultrasonic transducer means located in acoustic contact with a fluid stream, a first feedback path coupling the output of a first of said transducer means to the input of a second of the transducer means such that signals transmitted upstream from said second transducer means to said first transducer means are recirculated to the second transducer means through said first feedback path, a second feedback path coupling the output of said second transducer means to the input of said first transducer means such that signals transmitted downstream from said first transducer means to the second transducer means are recirculated to the first transducer means through said second feedback path, means for causing N pulses to be transmitted from both said first and second transducer means over a given time interval whereby each transmitted pulse will have a corresponding received pulse which is delayed with respect to its transmitted pulse, and circuit means coupled to said feedback paths for generating a signal proportional to the time delay between only the Nth received pulses in the respective feedback paths and for modifying said signal by an amount dependent upon the speed of sound in said fluid at rest, said modified signal providing an indication of fluid flow.

2. The combination of claim 1 wherein said modified signal is proportional to the quantity $$c^2 N \Delta t$$

where $N \Delta t$ is the time difference between the Nth received pulses in the respective feedback paths and $c$ is the speed of sound in said fluid at rest.

3. The combination of claim 2 including means for determining $c^2$ from the transit time of pulses between said transducer means.

4. The combination of claim 3 including means for generating a waveform and for producing an output which closely approximates the inverse of the square of time following a specific transmitted pulse, and means for sampling the instantaneous value of said waveform at a time corresponding to a specific received pulse to generate a signal which modifies the determined rate of flow.

5. In a flowmeter, the combination of at least one pair of oppositely disposed ultrasonic transducer means located in acoustic contact with a fluid stream, a first feedback path coupling the output of a first of said transducer means to the input of a second of the transducer means such that signals transmitted upstream from said second transducer means to said first transducer means are recirculated to the second transducer means through said first feedback path, a second feedback path coupling the output of said second transducer means to the input of said first transducer means such that signals transmitted downstream from said first transducer means to the second transducer means are recirculated to the first transducer means through said second feedback path, means for causing the same number $N$ of pulses to be transmitted from both said first and second transducer means over a time interval whereby each transmitted pulse will have a corresponding received pulse which is delayed with respect to its transmitted pulse, and electrical circuitry coupled to said feedback paths for generating a signal dependent upon the speed of sound in said fluid at rest and proportional to $$\Delta t + 2 \Delta t + 3 \Delta t + \ldots + N \Delta t$$

where $\Delta t$ is the time difference between the first received pulses of said same number in the respective sing-around loops.

6. In a flowmeter, the combination of at least one pair of oppositely disposed ultrasonic transducer means located in acoustic contact with a fluid stream, a first feedbath path coupling the output of a first of said transducer means to the input of a second of the transducer means such that signals transmitted downstream from said first transducer means to the second transducer means are recirculated to the first transducer means through said second feedback path, means for causing the same number $N$ of pulses to be transmitted from both said first and second transducer means over a time interval whereby each transmitted pulse will have a corresponding received pulse which is delayed with respect to its transmitted pulse, the initial transmitted pulses in the respective feedback paths being delayed with respect to each other by a time delay $\tau$, and electrical circuitry coupled to said feedback paths for generating a signal dependent upon the speed of sound in said fluid at rest and proportional to $$\tau + (\Delta t + \tau) + (2 \Delta t + \tau) + (3 \Delta t + \tau) \ldots + (N \Delta t + \tau),$$

where OT is the time difference between the first received pulses of said same number in the respective ring around loops.

* * * * *

UNITED STATES PATENT OFFICE
CERTIFICATE OF CORRECTION

Patent No. 3,653,259                    Dated April 4, 1972

Inventor(s) James L. McShane

It is certified that error appears in the above-identified patent and that said Letters Patent are hereby corrected as shown below:

Column 1, line 25, change "$t_A = d/c+v$" to -- $t_A = d/(c+v)$ -- and "$t_B = d/c-v$" to -- $t_B = d/(c-v)$ --.
line 28, change "$(2 dv/c^2-v^2)$" to -- $2 dv/(c^2-v^2)$ --.
line 37, change "$v = (1/2d)c^2 \Delta t$" to -- $v = \frac{1}{2d}(c^2 \Delta t)$ --.
line 38, change "$(1/2d)$" to -- $\frac{1}{2d}$ --.
line 49, change "$(c+v/d)$" to -- $(c+v)/d$ -- and "$c-v/d$" to --$(c-v)/d$;

Column 3:
line 10, change "$t_A = (d/c+v)$" to -- $t_A = d/(c+v)$ --.
line 12, change "$t_B = (d/c-v)$" to -- $t_B = d/(c-v)$ --;
line 15, change "$(2dv/c^2-v^2)$" to -- $2dv/(c^2-v^2)$ --;
line 24, change "$(1/2d) c^2 \Delta t$" to -- $\frac{1}{2d}(c^2 \Delta t)$ --;
line 25, change "$1/2d$" to -- $\frac{1}{2d}$ --;
line 41, change "$2v/d(d^2/c^2-v^2)$" to -- $(2v/d) d^2/(c^2-v^2)$ --;
line 43, change "$(d^2/c^2-v^2)$" to -- $d^2/(c^2-v^2)$ --;
line 45, change "$\Delta t = (2vt_A t_B/d)$" to -- $\Delta t = 2vt_A t_B/d$ --;
line 52, change "$(d \Delta t/2t_{NF}^2)$" to -- $d \Delta t/(2t_{NF}^2)$ --;
line 73, change "$(2 \Delta v \cot \theta/c^2-(v \cos \theta)^2)$" to
-- $2Dv \cos t \theta/[c^2-(v \cos \theta)^2]$ --;
line 74, change "$(1/2D \cot \theta)c^2 \Delta t, (v << c)$" to
-- $[1/(2D \cot \theta)]c^2 \Delta t, (v \ll c)$ --.
line 75, change "$(D/2 \sin \theta \cos \theta)(\Delta t/t_A t_B)$" to
-- $[D/(2 \sin \theta \cos \theta)] \Delta t/(t_A t_B)$ --.
Column 4; line 14, change "$N \Delta t$" to -- $N \Delta t$ --;
Column 6; line 53, change "$K_1 \varepsilon - K_2 t + K_3$" to -- $K_1 \exp(-K_2 t) + K_3$

UNITED STATES PATENT OFFICE
CERTIFICATE OF CORRECTION

Page 2

Patent No. 3,653,259   Dated April 4, 1972

Inventor(s) James L. McShane

It is certified that error appears in the above-identified patent and that said Letters Patent are hereby corrected as shown below:

Column 10; line 53, change "$t_{on} - \tau / t_B$" to -- $(t_{on} - \tau)/t_B$ --.

Column 12, line 18, change "$\Delta t, 2\ 1/3 t$, etc." to -- $\Delta t, 2\Delta t$, etc. --.

Column 14, line 27, change "OT" to -- $\Delta t$ --.

Signed and sealed this 1st day of January 1974.

(SEAL)
Attest:

EDWARD M. FLETCHER, JR.
Attesting Officer

RENE D. TEGTMEYER
Acting Commissioner of Patents